United States Patent Office 3,087,787
Patented Apr. 30, 1963

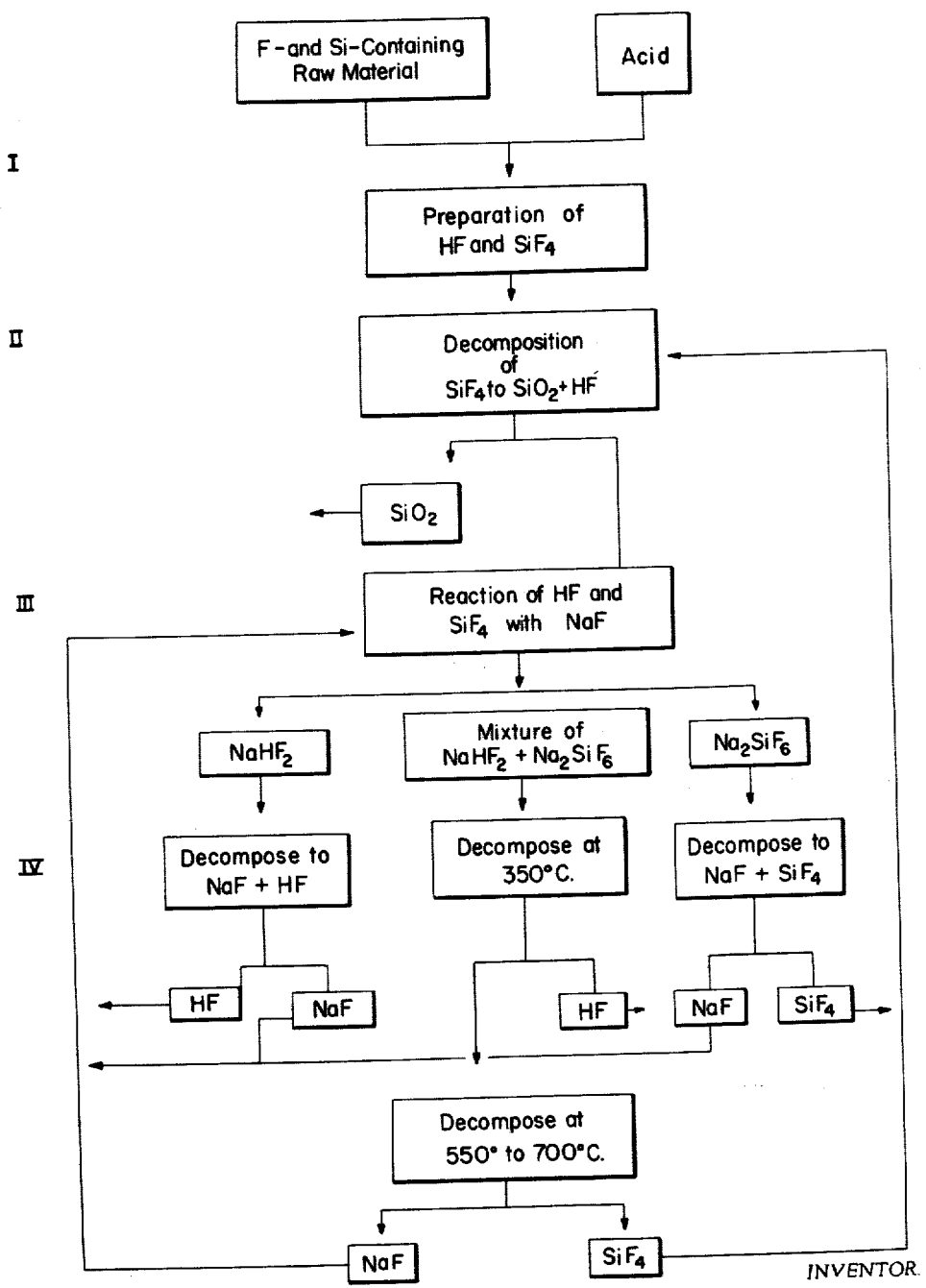

3,087,787
PROCESS FOR THE PRODUCTION OF
HYDROGEN FLUORIDE
Gösta Lennart Flemmert, Nynasvagen 1A,
Nynashamn, Sweden
Filed Sept. 12, 1957, Ser. No. 683,444
12 Claims. (Cl. 23—153)

The present invention relates to a process for the production of hydrogen fluoride, employing cheap and readily accessible fluorine- and silicon-containing raw materials, and more particularly, to a process for the production of hydrogen fluoride which yields silicon dioxide in finely divided form as a useful byproduct.

Hydrogen fluoride usually is prepared by the reaction of phosphate rock fluorspar or like impure calcium fluoride containing siliceous impurities, including silicon dioxide and silicates, with sulfuric acid. The reactions which take place are as follows:

(1) $H_2SO_4 + CaF_2 \rightarrow CaSO_4 + 2HF\uparrow$
(2) $4HF + SiO_2 \rightarrow SiF_4\uparrow + 2H_2O$
(3) $3SiF_4 + 2H_2O \rightarrow 2H_2SiF_6 + SiO_2$ Silicon tetrafluoride is formed as a byproduct by Reaction 2 and this formation leads to a considerable loss of hydrogen fluoride when the content of siliceous impurities is as low as 5%.

This loss of fluorine can be avoided by using a calcium fluoride having a low silicon content, but this calcium fluoride is an expensive raw material. Therefore, the art has directed itself to the problem of obtaining as much hydrogen fluoride as possible from the silicon-containing calcium fluoride raw materials.

Engelson et al. in U.S. Patent No. 2,631,083 propose to overcome this problem by preparing a calcium fluoride having a low content of silicon dioxide from the impure calcium fluoride starting material. Engelson et al. point out that for commercial use siliceous fluorspar cannot contain more than about 12% silica. When used as a raw material for the production of hydrofluoric acid, the fluorspar cannot contain less than 97% calcium fluoride, nor more than 1.5% silica. However, a large proportion of the siliceous fluorspar deposits in the world fall below this minimum standard of purity.

Engelson et al., therefore, address themselves to a method of removing the silica from the calcium fluoride and thus upgrading it for use in the production of hydrogen fluoride, to the so-called "acid grade" containing 97% calcium fluoride, or higher. The starting material is reacted with hydrofluoric acid in aqueous solution. The fluosilicic acid thereby obtained is vaporized and burned, resulting in the formation of hydrogen fluoride and silicon dioxide, and the hydrogen fluoride is used for leaching out silicon dioxide from the calcium fluoride in aqueous solution. The purified calcium fluoride then can be used in the reaction with sulfuric acid to produce hydrogen fluoride.

It has long been known that siliceous fluorspar can be stripped of its silica content by treating it with hydrofluoric acid, obtaining a hydrofluosilicic acid solution. However, this process is not practicable, since an equivalent amount of hydrofluoric acid is consumed, and no net gain of fluorine is achieved. Winter et al. No. 2,588,786 propose to avoid this by adding sodium fluoride to the hydrofluosilicic acid solution obtained by extraction of the fluorspar with aqueous hydrofluoric acid solution. This results in the formation of sodium fluosilicate as a precipitate, and an aqueous solution of hydrofluoric acid. The hydrofluoric acid solution is separated, concentrated, and treated with a further amount of sodium fluoride, which results in the formation of a precipitate of sodium bifluoride. Sodium bifluoride is separated and decomposed thermally at about 500° F. (approximately 260° C.) with the formation of anhydrous hydrogen fluoride. Sodium fluoride which is added in the process is recovered by thermal decomposition of sodium fluosilicate, and the sodium bifluoride.

In the reaction of fluorspar and sulfuric acid, silicon tetrafluoride which is formed as a byproduct escapes as a gas. If this material could be recovered, the process could be made more practicable. Breton et al. No. 2,410,043 propose to recover this waste silicon tetrafluoride by absorbing the waste gases in lime, with the formation of calcium fluosilicate. This is decomposed by heat to yield calcium fluoride and silicon tetrafluoride. The silicon tetrafluoride can be recycled, whereas the calcium fluoride, which is obtained in a pure state, may be used in the production of hydrogen fluoride.

It is apparent that the processes which have been described heretofore have been directed either to purifying the fluorspar, or to utilizing the hydrofluoric acid solution extracts which are obtainable from the fluorspar. The purification type processes are disadvantageous in that the purification is an additional and costly step, and still leaves the production of hydrogen fluoride to the final reaction with sulfuric acid and heat. The extraction type processes have the difficulty that per cycle only a small portion of the fluorine in the fluorspar is recovered in the form of hydrofluoric acid.

In accordance with the process of the instant invention, hydrogen fluoride can be produced directly from impure silicon- and fluorine-containing material by producing silicon tetrafluoride therefrom, and utilizing the silicon tetrafluoride as a source of hydrogen fluoride. Hydrogen fluoride obtained with the silicon tetrafluoride from the material is carried through the process unchanged, and recovered at the conclusion with hydrogen fluoride produced from silicon tetrafluoride. The process is carried out in four stages, in sequence.

Stage I: The fluorine and silicon-containing raw material is converted to silicon tetrafluoride and hydrogen fluoride by any method.

Stage II: The mixed hydrogen fluoride and silicon tetrafluoride are reacted with water in the vapor phase to produce silicon dioxide and hydrogen fluoride, and the silicon dioxide which is suspended in the hydrogen fluoride-containing gas is separated from the gas.

Stage III: The hydrogen fluoride and unreacted silicon tetrafluoride are absorbed on solid sodium fluoride, or are condensed to form a mixture of hydrofluoric acid and hydrofluosilicic acid, which is then treated with solid sodium fluoride. In either case, sodium bifluoride and sodium fluosilicate are obtained.

Stage IV: The sodium bifluoride and sodium fluosilicate are decomposed to liberate hydrogen fluoride and silicon tetrafluoride, respectively.

The following reactions take place:

Stage I:  (1) $H_2SO_4 + CaF_2 \longrightarrow CaSO_4 + 2HF\uparrow$
(2) $4HF + SiO_2 \longrightarrow SiF_4\uparrow + 2H_2O$
Stage II: (3) $SiF_4 + 2H_2O \longrightarrow SiO_2\downarrow + 4HF$
Stage III: (4) $HF + NaF \longrightarrow NaHF_2$
(5) $SiF_4 + 2NaF \longrightarrow Na_2SiF_6$ Stage IV: (6) $NaHF_2 \xrightarrow{\Delta} HF\uparrow + NaF$ (7) $Na_2SiF_6 \xrightarrow{\Delta} SiF_4\uparrow + 2NaF$ The silicon tetrafluoride can be recycled to (3), and the sodium fluoride recycled to (4) and (5). Thus, none of the fluorine in the raw material is wasted; all of it is recovered as hydrogen fluoride.

If a mixture of sodium fluosilicate and sodium bifluoride is obtained, they can be decomposed in sequence, so as to yield the gases separately in a manner in which they can be separately recovered. When the mixture is heated to about 350° C. the sodium bifluoride only is decomposed, to yield sodium fluoride and hydrogen fluoride, which escapes and may be recovered by condensation. Next, the temperature is raised to from 550 to 700° C. and air is passed through the furnace, whereby silicon tetrafluoride is liberated, and can be recycled for reuse.

On the other hand, the sodium fluosilicate can be obtained separately by adding just enough sodium fluoride to the initial mixture of hydrofluoric and hydrofluosilicic acids to form sodium fluosilicate. This is filtered off, and then more sodium fluoride is added in order to precipitate the hydrofluoric acid in the form of sodium bifluoride. The separate salts can then be decomposed when desired by heating to 350° C. and to from 550 to 700° C., respectively.

The process of the invention is illustrated in the drawing which is to be considered together with the following description.

It will be evident that the process can be operated as a cyclic process in which the only raw materials are the silicon- and fluorine-containing materials, acid, and a flame or water for decomposition of the silicon tetrafluoride. Hydrogen fluoride is obtained in a pure state at the conclusion of the process, and a finely-divided silicon dioxide is a valuable byproduct.

Under suitable conditions it is possible to convert 95% or more of the fluorine content of the raw materials into hydrogen fluoride. This is because substantially none of the fluorine is lost in byproducts which are not capable of recovery.

The silicon tetrafluoride which is used in the process of the invention can be obtained from any silicon- and fluorine-containing raw materials by any of the processes known to those skilled in the art. A very satisfactory source is a high-silica fluorspar containing calcium fluoride and more than 3% silica, either as calcium fluosilicate or silicon dioxide. Another source is the sodium fluosilicate obtained as a byproduct in treating fluorine-containing phosphates. The thermal decomposition of fluosilicates in general also can be used as a source. The silicon-containing fluorine compounds are reacted with an inorganic acid such which preferably is relatively nonvolatile, such as sulfuric acid or phosphoric acid, by known means, producing a mixture of hydrogen fluoride and silicon tetrafluoride. Such processes are, for example, described in Thorpe's Dictionary of Applied Chemistry, 4th Edition, volume 5, page 278 et seq.

The gaseous silicon tetrafluoride, mixed with any hydrogen fluoride also obtained, is decomposed either by hydrolysis or by combustion in a flame. Both reactions are carried out in the vapor phase. In this reaction a finely-divided silicon dioxide mixed in suspension in gaseous hydrogen fluoride and unreacted silicon tetrafluoride is obtained as a product.

A very desirable process for the combustion of the silicon tetrafluoride is described in U.S. application for Letters Patent Serial No. 437,383, filed June 17, 1954, now U.S. Patent 2,819,151, issued January 7, 1958, of which this application is a continuation-in-part. By this process silicon fluoride, a combustible gas and oxygen are reacted in a flame, and it is possible to obtain silica having a particle size within the range of from 5 to 50 m$\mu$.

The reaction probably proceeds in certain zones of the flame. The intensity of the flame in these reaction zones is of primary importance in determining the particle size of the silica, and for this reason can be regarded as equivalent to the intensity of the reaction. However, the flame intensity in the reaction zones is difficult to measure except in terms of the heat liberated by the reaction, which of course is directly proportional to the heat liberated by the flame, and therefore for the purposes of the invention, the intensity of the reaction is measured by the intensity of the flame itself.

The intensity of the flame can be measured in terms of the amount of heat liberated per unit volume and per unit time, i.e., $$\frac{B.t.u.}{Cu.\ ft.\ min.}$$

These quantities are measured in British thermal units, abbreviated B.t.u., cubic feet and minutes. For convenience of representation, reciprocal B.t.u. units are used, i.e., $$\frac{1}{B.t.u.}$$

or B.t.u.$^{-1}$, and the terms "reciprocal B.t.u." and "B.t.u.$^{-1}$" will be understood to refer to the volume of the flame in cu. ft. for each B.t.u. evolved per minute in the flame.

Accordingly, in the process the flame intensity is maintained within the range from about $0.1 \times 10^{-5}$ to about $1.3 \times 10^{-5}$ B.t.u.$^{-1}$. This range lies essentially below the intensity of a normal flame in which silicon fluorides are subjected to the reaction in accordance with the said disclosure. These intensity limits are critical, inasmuch as at flame intensities both above and below these limits the silica particle size again increases. All of the disclosure of application Serial No. 437,383 is accordingly incorporated herein by reference, inasmuch as amorphous silicon dioxide of this particle size is an especially valuable byproduct.

However, it will be understood that the particular method of decomposing the silicon tetrafluoride is in no way critical to the production of hydrogen fluoride, the primary product of the invention. Other methods of combustion of the silicon tetrafluoride are described in the literature, for example, in British Patents Nos. 258,313, dated September 15, 1926, and 438,782, dated November 22, 1935. A method for the hydrolysis of silicon tetrafluoride in the vapor phase is described in the Broughton Patent No. 2,535,036, dated December 26, 1950.

The hydrolysis by means of water vapor may also be carried out at temperatures above 500° C. in the presence of a gas such as air which reduces the concentration of silicon tetrafluoride.

Further information with regard to the vapor phase hydrolysis reaction will be found in Baur, Z. physik. Chem. 48, 483–503 (1904), and Lenfesty et al., Ind. Eng. Chem. 44, 1448–1450 (1952). These processes will produce silica particles in the range of from 100 to 400 m$\mu$, as contrasted to silica having the mean particle size of 50 m$\mu$ or less when prepared in accordance with the process of Serial No. 437,383.

The reaction mixture obtained by any of these processes contains finely-divided silicon dioxide suspended in a hydrogen fluoride-containing gas with unreacted silicon tetrafluoride. The silicon dioxide is separated by any suitable means. One or more series-connected cyclones can be used. Filtration also may be feasible.

It is then necessary to recover the hydrogen fluoride and unreacted silicon tetrafluoride. This can be done in a number of alternative ways, all involving absorption of the gases upon solid sodium fluoride.

The waste gases may be passed through an absorption tower containing solid sodium fluoride at a temperature above the dew point but below about 200° C. Under these conditions the hydrogen fluoride and silicon tetrafluoride are absorbed, whereas other gases which may be present in the mixture, such as carbon dioxide and water vapor, are untouched. By this method a mixture of sodium fluosilicate and sodium bifluoride is obtained.

Another method is to cool the waste gases to below 100° C., preferably to a temperature within the range from about 20° C. to about 80° C., whereby a condensate is obtained which contains a mixture of hydrofluoric acid and hydrofluosilicic acid dissolved in the condensed water vapor present in the gases. To this condensate there is added, with agitation, solid sodium fluoride. If the amount of sodium fluoride added is sufficient to react with all of these materials present, a mixture of sodium bifluoride and sodium fluosilicate is obtained as a precipitate. This may easily be separated from the water by decantation or filtration.

However, if it is desired to obtain relatively pure sodium bifluoride and sodium fluosilicate, it is possible to carry out the reaction with sodium fluoride in two steps. In the first step, sufficient sodium fluoride is added to react with the hydrofluosilicic acid present, forming a precipitate of sodium fluosilicate. This precipitate is removed. Thereafter additional sodium fluoride is added, in an amount sufficient to precipitate the hydrofluoric acid present in the form of sodium bifluoride. This, likewise, is removed.

The sodium fluosilicate and sodium bifluoride thus obtained are decomposed by heat. Sodium bifluoride is decomposed to sodium fluoride, liberating hydrogen fluoride, at temperatures above about 350° C. Sodium fluosilicate is decomposed to sodium fluoride and silicon tetrafluoride at temperatures above 550° C., ranging up to 700° C. Thus, it is possible to decompose these salts separately even when they are present in admixture. The mixture of sodium bifluoride and sodium fluosilicate, for instance, can be heated in an electric furnace or in a gas-heated rotary furnace to about 350° C., decomposing the sodium bifluoride. The hydrogen fluoride is recovered by any desired means, such as by condensation. Next, the mixture is heated to 550 to 700° C. and air is passed through the furnace, whereupon the sodium fluosilicate is decomposed, and silicon tetrafluoride is liberated. This together with the air is recycled to the combustion or hydrolysis apparatus for reuse, and further recovery of hydrogen fluoride.

It is apparent that the decomposition of the sodium bifluoride and sodium fluosilicate can be carried out continuously in two series-connected rotary furnaces, the first held at about 350° C., and the second at a temperature within the range from about 550 to 700° C.

The sodium fluoride obtained as a residual product in these processes is recovered and reused for the production of sodium bifluoride and sodium fluosilicate from the waste gases obtained in the combustion or hydrolsyis step.

The following examples represent in the opinion of the inventor the best embodiments of his invention:

EXAMPLES 1 to 7

In these examples the silicon tetrafluoride was generated by heating a mixture of silica (sand) and calcium fluoride together with sulfuric acid. The silicon tetrafluoride so obtained was mixed with the combustible gas listed in the table below and with air or a 40% nitrogen—60% oxygen mixture and the mixture burned using a jet burner fitted with three concentric tubes. The mixture of silicon tetrafluoride, combustible gas, oxygen and inert gases was passed through the intermediate tube, and air or (in Examples 4 and 7) 60% oxygen and 40% nitrogen mixture was passed through the outermost and innermost tubes. By varying the amount of oxygen and inert gases passed through the different tubes, it was possible to vary the intensity of the flame, as given in the table below. The mixture of hydrocarbons used in Examples 5–7 had the following composition: 2% $CH_4$, 11% $C_2H_6$, 51% $C_3H_8$ and 25% $C_4H_{10}$, giving a neat combustion heat of 2480 B.t.u. per cu. ft.

The silicon dioxide formed was separated from the combustion gases by means of a ceramic filter. The products obtained in all the examples were white, amorphous, voluminous powders which by examination under the electron microscope proved to be made up of amorphous, spherical particles having mean diameters ranging from 9 to 91 m$\mu$ of which a major proportion were associated as small aggregates.

The effluent gases from the combustion chamber, composed of unreacted oxygen, inert gases, silicon tetrafluoride and hydrogen fluoride, were passed through an absorption tower containing solid sodium fluoride held at a temperature of 175° C. In this chamber substantially all of the hydrogen fluoride and silicon tetrafluoride were absorbed, as shown by analysis of the gases emerging from the absorption tower. Absorption was continued until the sodium fluoride in the tower was exhausted, as shown by the appearance of a substantial quantity of hydrogen fluoride and silicon tetrafluoride in the effluent from the tower, after which the mixture of sodium bifluoride and sodium fluosilicate was removed from the tower and transferred to an electric furnace. There it was heated to a temperature of about 350° C. and held at this temperature for two hours. At this temperature the sodium bifluoride was decomposed, and the hydrogen fluoride which escaped in gaseous form was recovered by condensation in a cooler held at 0° C.

After hydrogen fluoride had ceased to evolve, the temperature in the furnace was increased to 650° C., and air was passed through. Silicon tetrafluoride liberated together with the air was conducted to the combustion chamber for reuse.

The yield of hydrogen fluoride based upon the weight of silicon tetrafluoride used is given in the table. It is apparent that excellent yields are obtainable.

*Table I*

| Example No. | Combustible gas | Amount of Combustible gas cu. ft./min. | Heat evolved in the flame, B.t.u./min. | Flame Volume cu. ft. | Flame Intensity | | Particle size of silicon dioxide m$\mu$ | Percent Yield | |
|---|---|---|---|---|---|---|---|---|---|
| | | | | | B.t.u./cu. ft./min. | Reciprocal B.t.u.$^{-1}$ | | SiO$_2$[1] | HF[2] |
| 1 | Hydrogen | 0.710 | 195 | 0.00513 | 3.80×10$^4$ | 2.63×10$^{-5}$ | 86 | 18 | 96 |
| 2 | ...do | 0.710 | 195 | 0.00259 | 7.70×10$^4$ | 1.30×10$^{-5}$ | 53 | 64 | 96 |
| 3 | ...do | 0.710 | 195 | 0.00110 | 17.7×10$^4$ | 0.57×10$^{-5}$ | 9 | 87 | 97 |
| 4 | ...do | 0.710 | 195 | 0.00025 | 78.0×10$^4$ | 0.13×10$^{-5}$ | 42 | 92 | 98 |
| 5 | Mixed hydrocarbons | 0.715 | 436 | 0.0111 | 3.92×10$^4$ | 2.55×10$^{-5}$ | 91 | 16 | 96 |
| 6 | ...do | 0.175 | 436 | 0.0058 | 7.51×10$^4$ | 1.33×10$^{-5}$ | 62 | 49 | 97 |
| 7 | ...do | 0.175 | 436 | 0.0029 | 15.0×10$^4$ | 0.67×10$^{-5}$ | 12 | 83 | 98 |

[1] One cycle.
[2] Repeated cycles, average.

EXAMPLE 8

Fluorspar containing 12% silica and sand in 20% excess based on the total $SiO_2$ were reacted with a 10% excess of 70% sulfuric acid solution at 90° C., producing 3.2 kg. per hour silicon tetrafluoride vapor, which was heated to 550° C. and blended with a flowing stream of equal parts of steam and air held at the same temperature. The amount of steam used was in 30% excess of the silicon tetrafluoride used. The reaction began immediately after contact, as evidenced by a white powder visible in the gas current. The mixture was conducted through a brick-lined reaction chamber held at 550° C. and then the finely-divided amorphous silica formed was separated in two series-connected cyclones. The waste gases were cooled to about 20° C. in a condenser to an aqueous condensate including in solution hydrofluoric and hydrofluosilicic acids. To this condensate there was added sufficient solid sodium fluoride to react with the hydrofluosilicic acid present and form sodium fluosilicate as a precipitate. This precipitate was filtered off. There was then added another portion of sodium bifluoride in an amount stoichiometrically equivalent to the hydrofluoric acid present, whereupon sodium bifluoride precipitated and was removed by filtration.

The sodium bifluoride was dried and decomposed by heating in a gas-heated rotary furnace to about 350° C. The hydrogen fluoride which escaped was recovered by condensation. A 95% yield of hydrogen fluoride was obtained, based on the amount of silicon tetrafluoride used.

The sodium fluosilicate was dried and decomposed by heating in an electric furnace at 600° C., passing air through the furnace during the decomposition. The silicon tetrafluoride which was liberated was recycled for reuse in the hydrolysis chamber.

The sodium fluoride remaining was recovered and reused to form sodium bifluoride and sodium fluosilicate, respectively.

EXAMPLE 9

A continuous stream of 12.1 kg. per hour silicon tetrafluoride was made by reacting calcium fluoride, silicon dioxide and sulfuric acid at 90° C. The gas was mixed with another gas stream containing 6.3 kg. silicon tetrafluoride and 9.6 kg. air per hour and the resulting gas stream was conducted to a burner having three concentric tubes. In the burner the silicon tetrafluoride was mixed in the intermediate tube with a continuous flow of 27.5 kg. per hour mixed hydrocarbons of the same composition as stated in Examples 5 to 7. A further 540 kg. per hour air was introduced into the burner, through the outermost and innermost tubes, as in Examples 1 to 7, and the mixture was burned to form fine particle silica and hydrogen fluoride. The silica was separated in two series-connected cyclones, and the exit gases cooled to 15° C. continuously in a cooling tower. The condensate obtained was mixed with an equivalent amount of solid sodium fluoride and the precipitate obtained was filtered off and dried in a gas-heated rotary dryer at 100° C. The mixture of sodium bifluoride and sodium fluosilicate was continuously heated to 350° C. in a gas-heated rotary furnace. At this temperature the sodium bifluoride was decomposed, forming sodium fluoride and hydrogen fluoride. The hydrogen fluoride was condensed in a cooler at 0° C. and taken up in steel containers. 8.82 kg. per hour hydrogen fluoride was obtained, 95% of theoretical.

The mixture of sodium fluoride and sodium fluosilicate was decomposed at 600° C. continuously in a rotary furnace through which 9.6 kg. per hour air preheated to 600° C. was blown. From this furnace 6.3 kg. per hour silicon tetrafluoride was obtained, together with the air. This mixture of silicon tetrafluoride and air was recycled and introduced into the flame as described above.

The sodium fluoride obtained by decomposition of sodium bifluoride and siliconfluoride also was recovered and recycled for use in the process.

The hydrogen fluoride which is obtained by the process of the invention is capable of use in conventional ways. The process is capable of producing an anhydrous hydrogen fluoride in a very pure state.

The silica particles produced by the process are amorphous, that is, they are noncrystalline in character. They can be agglomerated to form larger particles if desired.

The finely-divided, amorphous silica prepared by the process of the invention is particularly adapted for use as a reinforcing agent in rubber compounding. However, it may also be employed for other purposes, such as a pigment, a filler for synthetic resins and a reinforcing agent for synthetic polymers, such as silicone resins, which are, basically, modified silicic oxide polymers.

I claim:
1. The process for the production of hydrogen fluoride and silica from silicon tetrafluoride prepared from silicon- and fluorine-containing material in which the silicon content expressed as silica is greater than 3% which comprises the steps of reacting the silicon tetrafluoride with water in the vapor phase to form a gaseous suspension consisting essentially of hydrogen fluoride, unreacted silicon tetrafluoride and silica, removing the silica from such gases to obtain a gaseous mixture consisting essentially of hydrogen fluoride and unreacted silicon tetrafluoride, reacting the hydrogen fluoride and said unreacted silicon tetrafluoride with sodium fluoride to form sodium bifluoride and sodium fluosilicate, heating the sodium bifluoride to a temperature to decompose it without substantial decomposition of sodium fluosilicate to recover a gas having a higher concentration of hydrogen fluoride than said gaseous mixture, and heating the sodium fluosilicate at a temperature in excess of about 550° C. to decompose it selectively to recover a gas having a higher concentration of silicon tetrafluoride than said gaseous mixture, and returning said last mentioned silicon tetrafluoride to said vapor phase water treating step.

2. A process in accordance with claim 1, in which the silicon tetrafluoride is hydrolyzed to form silica in the flame of a combustible gas.

3. A process in accordance with claim 1, in which the silicon tetrafluoride is hydrolyzed with steam.

4. A process in accordance with claim 1 in which the gaseous mixture is condensed to form an aqueous solution of hydrogen fluoride and fluosilicic acid, and this solution is treated with sodium fluoride.

5. A process in accordance with claim 4, in which the amount of sodium fluoride is added in two stages, the amount added at first being stoichiometrically equivalent to that required to react with substantially all of the fluosilicic acid present to form sodium fluosilicate, precipitating the sodium fluosilicate and separating it from the solution, and then adding sufficient sodium fluoride stoichiometrically equivalent to the hydrogen fluoride in solution, precipitating sodium bifluoride and separating it from the solution.

6. A process in accordance with claim 1, in which the silicon tetrafluoride is reacted in the gas phase with a combustible gas and a free-oxygen containing gas in a flame zone liberating from $0.1 \times 10^{-5}$ to $1.3 \times 10^{-5}$ B.t.u.$^{-1}$ to form silica and hydrogen fluoride.

7. A process in accordance with claim 1, in which the hydrogen fluoride and silicon tetrafluoride in the vapor phase are absorbed upon solid sodium fluoride.

8. A process in accordance with claim 1, in which the silicon tetrafluoride is obtained by the reaction of fluorspar with an inorganic acid.

9. A process in accordance with claim 1, in which the silicon tetrafluoride is obtained by the reaction of a fluosilicate with an inorganic acid.

10. A process for the production of hydrogen fluoride and silica from silicon tetrafluoride prepared from silicon- and fluorine-containing material in which the silicon content expressed as silica is greater than 3% which comprises the steps of reacting the silicon tetrafluoride with water in the vapor phase to form hydrogen fluoride and silica and leave some unreacted silicon tetrafluoride in the waste gas, removing the silica from the waste gas, reacting the hydrogen fluoride and unreacted silicon tetrafluoride in the vapor phase with sodium fluoride to form a mixture of sodium bifluoride and sodium fluosilicate, heating said mixture to a temperature in excess of about 350° C. but below temperatures at which a significant amount of decomposition of sodium fluosilicate takes place, to decompose selectively said sodium bifluoride and recover hydrogen fluoride, and thereafter heating the sodium fluosilicate at a temperature in excess of about 550° C. to decompose it and recover silicon tetrafluoride.

11. The process for the separate production and recovery of hydrogen fluoride and silica starting from silicon tetrafluoride prepared from silicon and fluorine-containing material in which the silicon content expressed as silica is greater than 3%, which comprises reacting said silicon tetrafluoride with water in the vapor phase to form a gaseous suspension consisting essentially of hydrogen fluoride, unreacted silicon tetrafluoride and silica, separating the silica therefrom, recovering a gaseous mixture consisting essentially of hydrogen fluoride and silicon tetrafluoride, reacting the hydrogen fluoride with sodium fluoride to form sodium bifluoride, reacting the silicon tetrafluoride with sodium fluoride to form sodium fluosilicate, heating the sodium bifluoride at a temperature to decompose it to sodium fluoride and hydrogen fluoride, while minimizing decomposition of sodium fluosilicate, separating hydrogen fluoride thus formed, heating the sodium fluosilicate at a temperature in excess of about 550° C. to decompose it to recover sodium fluoride and silicon tetrafluoride, recycling silicon tetrafluoride thus formed for reaction with water in the vapor phase, and recycling sodium fluoride from both decomposition stages for reaction with hydrogen fluoride and silicon tetrafluoride, and recovering hydrogen fluoride from the system, thereby converting the fluorine content of the silicon tetrafluoride into hydrogen fluoride.

12. The process for the production of hydrogen fluoride and silica from silicon tetrafluoride prepared from silicon- and fluorine-containing material in which the silicon content expressed as silica is greater than 3% which comprises the steps of reacting the silicon tetrafluoride with water in the vapor phase to form a gaseous suspension consisting essentially of hydrogen fluoride, unreacted silicon tetrafluoride and silica, removing the silica from such gases to obtain a gaseous mixture consisting essentially of hydrogen fluoride and unreacted silicon tetrafluoride, reacting the hydrogen fluoride and said unreacted silicon tetrafluoride with sodium fluoride to form sodium bifluoride and sodium fluosilicate, heating the sodium bifluoride to a temperature sufficient to decompose it selectively to recover sodium fluoride and a gas having a higher concentration of hydrogen fluoride than said gaseous mixture, and heating the sodium fluosilicate at a temperature in excess of about 550° C. to decompose it selectively to recover sodium fluoride and a gas having a higher concentration of silicon tetrafluoride than said gaseous mixture, returning said last mentioned silicon tetrafluoride to said vapor phase water treating zone, and recycling said recovered sodium fluoride for reaction with the gaseous mixture of hydrogen fluoride and unreacted silicon tetrafluoride.

References Cited in the file of this patent
UNITED STATES PATENTS

| | | |
|---|---|---|
| 1,701,225 | Buchner | Feb. 5, 1929 |
| 2,535,036 | Broughton | Dec. 26, 1950 |
| 2,588,786 | Winter | Mar. 11, 1952 |
| 2,819,151 | Flemmert | Jan. 7, 1958 |
| 2,886,414 | Secord | May 12, 1959 |

OTHER REFERENCES

Mellor: "A Comprehensive Treatise on Inorganic and Theoretical Chemistry," Longmans, Green & Co., New York, N.Y., vol. 6, 1925, pages 946 and 948.

UNITED STATES PATENT OFFICE
CERTIFICATE OF CORRECTION

Patent No. 3,087,787                                            April 30, 1963

Gösta Lennart Flemmert

It is hereby certified that error appears in the above numbered patent requiring correction and that the said Letters Patent should read as corrected below.

Columns 5 and 6, Table I, third column, opposit Example No. 5, for "0.715" read -- 0.175 --; column 9, line 2, for "silicon" read -- silicon- --.

Signed and sealed this 19th day of November 1963.

(SEAL)
Attest:

ERNEST W. SWIDER

Attesting Officer

EDWIN L. REYNOLDS

Acting Commissioner of Patents